(12) United States Patent
Park et al.

(10) Patent No.: US 11,935,321 B2
(45) Date of Patent: Mar. 19, 2024

(54) METHOD AND APPARATUS WITH ANTI-SPOOFING

(71) Applicant: SAMSUNG ELECTRONICS CO., LTD., Suwon-si (KR)

(72) Inventors: Sungun Park, Suwon-si (KR); Kyuhong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 17/172,429

(22) Filed: Feb. 10, 2021

(65) Prior Publication Data

US 2021/0279441 A1 Sep. 9, 2021

(30) Foreign Application Priority Data

Mar. 5, 2020 (KR) .................. 10-2020-0027792
Dec. 30, 2020 (KR) .................. 10-2020-0187857

(51) Int. Cl.
*G06V 40/12* (2022.01)
*G06F 18/214* (2023.01)
*G06F 18/22* (2023.01)
*G06F 21/32* (2013.01)
*G06N 3/04* (2023.01)
(Continued)

(52) U.S. Cl.
CPC ........ *G06V 40/1388* (2022.01); *G06F 18/214* (2023.01); *G06F 18/22* (2023.01);
(Continued)

(58) Field of Classification Search
CPC ........... G06V 40/1365; G06V 40/1347; G06V 40/1382; G06V 10/763; G06V 10/764;
(Continued)

(56) References Cited

U.S. PATENT DOCUMENTS 7,505,613 B2 3/2009 Russo
7,804,984 B2 9/2010 Sidlauskas et al.
(Continued)

FOREIGN PATENT DOCUMENTS

CN 103279744 B 8/2016
KR 10-2017-0002892 A 1/2017
WO WO 2018/192672 A1 10/2018

OTHER PUBLICATIONS

Sutton, Oliver. "Introduction to k Nearest Neighbour Classification and Condensed Nearest Neighbour Data Reduction." *University lectures, University of Leicester* Feb. 2012 (10 pages English).

(Continued)

*Primary Examiner* — Jonathan A Boyd
(74) *Attorney, Agent, or Firm* — NSIP Law

(57) ABSTRACT

A processor-implemented anti-spoofing method includes: extracting an input embedding vector from input biometric information; obtaining a fake embedding vector of a predetermined fake model based on fake biometric information; obtaining either one or both of a real embedding vector of a predetermined real model and an enrolled embedding vector of an enrollment model the enrollment model being generated based on biometric information of an enrolled user; determining a confidence value of the input embedding vector based on the fake embedding vector and either one or both of the real embedding vector and the enrolled embedding vector; and determining whether the input biometric information is forged, based on the confidence value.

25 Claims, 8 Drawing Sheets

(51) Int. Cl.
  *G06N 7/01* (2023.01)
  *G06V 10/762* (2022.01)
  *G06V 10/764* (2022.01)

(52) U.S. Cl.
  CPC ............... *G06F 21/32* (2013.01); *G06N 3/04* (2013.01); *G06N 7/01* (2023.01); *G06V 10/763* (2022.01); *G06V 10/764* (2022.01); *G06V 40/1347* (2022.01); *G06V 40/1365* (2022.01); *G06V 40/1382* (2022.01)

(58) Field of Classification Search
  CPC .. G06V 40/1388; G06F 21/32; G06K 9/6215; G06K 9/6256; G06K 9/627; G06K 9/6218; G06K 9/6277; G06N 3/04; G06N 7/005; G06N 3/0454; G06N 3/0481; G06N 3/08
  See application file for complete search history.

(56) References Cited

U.S. PATENT DOCUMENTS

| | | | |
|---|---|---|---|
| 7,953,256 B2 | 5/2011 | Dias | |
| 9,672,409 B2 | 6/2017 | Jonsson et al. | |
| 9,961,077 B2 | 5/2018 | Lindemann | |
| 2007/0014443 A1* | 1/2007 | Russo | G06V 40/1388 382/124 |
| 2017/0004352 A1* | 1/2017 | Jonsson | G06V 40/1388 |

OTHER PUBLICATIONS

Bengio, et al. "Representation Learning: A Review And New Perspectives." IEEE transactions on pattern analysis and machine intelligence 35.8 (2013): 1798-1828. (31 pages in English).

Marasco, et al. "Robust and Interoperable Fingerprint Spoof Detection Via Convolutional Neural Networks." *2016 IEEE symposium on technologies for homeland security* (*HST*). IEEE, 2016. (6 pages English).

Li, et al. "An Original Face Anti-Spoofing Approach Using Partial Convolutional Neural Network." *2016 Sixth International Conference on Image Processing Theory, Tools and Applications* (*IPTA*). IEEE, 2016. (6 pages in English).

Extended European Search Report dated Jul. 21, 2021 in counterpart European Patent Application No. 21159949.3 (9 in English).

* cited by examiner

METHOD AND APPARATUS WITH ANTI-SPOOFING

CROSS-REFERENCE TO RELATED APPLICATIONS

This application claims the benefit under 35 USC § 119(a) of Korean Patent Application No. 10-2020-0027792, filed on Mar. 5, 2020, and Korean Patent Application No. 10-2020-0187857 filed on Dec. 30, 2020, in the Korean Intellectual Property Office, the entire disclosures of which are incorporated herein by reference for all purposes.

BACKGROUND

1. Field

The following description relates to a method and apparatus with anti-spoofing.

2. Description of Related Art

Technology for secure authentication of biometric information may be used with smartphones and various mobile and wearable devices. For example, among such forms of technology, fingerprint recognition technology may be used due to a high level of convenience, security, and economic feasibility. In general fingerprint recognition, user authentication or verification may be performed by obtaining a fingerprint image of a user through a sensor and comparing the obtained fingerprint image to a pre-registered fingerprint image. When a finely fabricated fake fingerprint pattern is input to the sensor, a fingerprint recognizing apparatus may not distinguish the fake fingerprint pattern from a genuine fingerprint pattern. Thus, the fingerprint recognizing apparatus may improperly recognize the fake fingerprint pattern as a biometric fingerprint. For example, when a material such as rubber, silicon, gelatin, epoxy, and latex on which a fingerprint pattern is engraved makes a contact with the sensor, the fingerprint engraved on such a material may be recognized as a human fingerprint. In terms of security of biometric information, distinguishing fake biometric information from real biometric information may be important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented anti-spoofing method includes: extracting an input embedding vector from input biometric information; obtaining a fake embedding vector of a predetermined fake model based on fake biometric information; obtaining either one or both of a real embedding vector of a predetermined real model and an enrolled embedding vector of an enrollment model the enrollment model being generated based on biometric information of an enrolled user; determining a confidence value of the input embedding vector based on the fake embedding vector and either one or both of the real embedding vector and the enrolled embedding vector; and determining whether the input biometric information is forged, based on the confidence value.

The confidence value may be determined based on a posterior probability between the input embedding vector and any one or any combination of the real embedding vector, the enrolled embedding vector, and the fake embedding vector.

The posterior probability may be calculated based on a distance or a similarity between the input embedding vector and the any one or any combination of the real embedding vector, the enrolled embedding vector, and the fake embedding vector.

The determining of the confidence value may include: determining a value of a first category corresponding to a case in which the input biometric information is not forged, based on a first distance between the real embedding vector and the input embedding vector and a third distance between the enrolled embedding vector and the input embedding vector; determining a value of a second category corresponding to a case in which the input biometric information is forged, based on a second distance between the fake embedding vector and the input embedding vector; and determining the confidence value based on the value of the first category and the value of the second category.

The determining of the value of the first category may include performing a weighted summation of the third distance and a lower value of the first distance and the third distance.

The determining of the confidence value based on the value of the first category and the value of the second category may include applying the value of the first category and the value of the second category to a softmax function and determining the confidence value.

The determining of the confidence value may include: estimating either one or both of a first posterior probability between the input embedding vector and the real embedding vector and a third posterior probability between the input embedding vector and the enrolled embedding vector; estimating a second posterior probability between the input embedding vector and the fake embedding vector; and determining the confidence value based on the second posterior probability and the either one or both of the first posterior probability and the third posterior probability.

The determining of the confidence value may include calculating one or more probability ratios based on the second posterior probability and either one or both of the first posterior probability and the third posterior probability; and the determining of whether the input biometric information is forged may include determining whether the input biometric information is forged based on the one or more probability ratios.

The calculating of the one or more probability ratios may include: calculating a first probability ratio between the first posterior probability and the second posterior probability; and calculating a second probability ratio between the second posterior probability and the third posterior probability, and the determining of the confidence value may include performing a weighted summation of the first probability ratio and the second probability ratio.

The method may include: determining one or more embedding vectors closest to the input embedding vector among a plurality of embedding vectors included in any one or any combination of the real model, the fake model and the enrollment model, to be a representative embedding vector.

The fake embedding vector may be an average value of a predetermined number of fake embedding vectors of the fake model that are closest to the input embedding vector.

The extracting of the input embedding vector may include extracting the input embedding vector from the input biometric information using a neural network that is trained to extract a feature for detecting whether biometric information is forged, and the neural network may be trained based on the real biometric information and the fake biometric information.

The fake model may correspond to a set of fake embedding vectors extracted from the fake biometric information that is forged, and the real model may correspond to a set of real embedding vectors extracted from unspecified real biometric information that is not forged.

A non-transitory computer-readable storage medium may store instructions that, when executed by a processor, configure the processor to perform the method.

In another general aspect, an anti-spoofing apparatus includes: a processor configured to: extract an input embedding vector from input biometric information; obtain a fake embedding vector of a predetermined fake model based on fake biometric information; obtain either one or both of a real embedding vector of a real model and an enrolled embedding vector of an enrollment model the enrollment model being generated based on biometric information of an enrolled user; determine a confidence value of the input embedding vector based on the fake embedding vector and either one or both of the real embedding vector and the enrolled embedding vector; and determine whether the input biometric information is forged, based on the confidence value.

The confidence value may be determined based on a posterior probability between the input embedding vector and any one or any combination of the real embedding vector, the enrolled embedding vector, and the fake embedding vector For the determining of the confidence value, the processor may be configured to: determine a value of a first category corresponding to a case in which the input biometric information is not forged, based on a first distance between the real embedding vector and the input embedding vector and a third distance between the enrolled embedding vector and the input embedding vector; determine a value of a second category corresponding to a case in which the input biometric information is forged, based on a second distance between the fake embedding vector and the input embedding vector; and determine the confidence value based on the value of the first category and the value of the second category.

For the determining of the confidence value, the processor may be configured to: estimate either one or both of a first posterior probability between the input embedding vector and the real embedding vector and a third posterior probability between the input embedding vector and the enrolled embedding vector; estimate a second posterior probability between the input embedding vector and the fake embedding vector; and determine the confidence value based on the second posterior probability and the either one or both of the first posterior probability and the third posterior probability.

For the determining of the confidence value, the processor may be configured to: calculate a first probability ratio between the first posterior probability and the second posterior probability; calculate a second probability ratio between the second posterior probability and the third posterior probability; and determine the confidence value based on the first probability ratio and the second probability ratio.

For the determining of the confidence value based on the first probability ratio and the second probability ratio, the processor may be configured to perform a weighted summation of the first probability ratio and the second probability ratio.

The processor may be configured to determine one or more embedding vectors closest to the input embedding vector among a plurality of embedding vectors included in any one or any combination of the real model, the fake model and the enrollment model, to be a representative embedding vector.

For the extracting of the input embedding vector, the processor may be configured to extract the input embedding vector from the input biometric information using a neural network that is trained to extract a feature for detecting whether biometric information is forged, and the neural network may be trained based on the real biometric information and the fake biometric information.

The apparatus may include a sensor configured to sense the biometric information.

The sensor may be a fingerprint sensor and the biometric information may correspond to a fingerprint.

In another general aspect, a processor-implemented anti-spoofing method includes: extracting an input embedding vector from input biometric information; determining a first, a second, and a third posterior probability respectively between the input embedding vector and a real embedding vector of a predetermined real model, a fake embedding vector of a predetermined fake model, and an enrolled embedding vector of an enrollment model of a user; determining a confidence value of the input embedding vector based on a first probability ratio between the first posterior probability and the second posterior probability, and on a second probability ratio between the second posterior probability and the third posterior probability; and determining whether the input biometric information is forged, based on the confidence value.

Other features and aspects will be apparent from the following detailed description, the drawings, and the claims.

Figure 1:
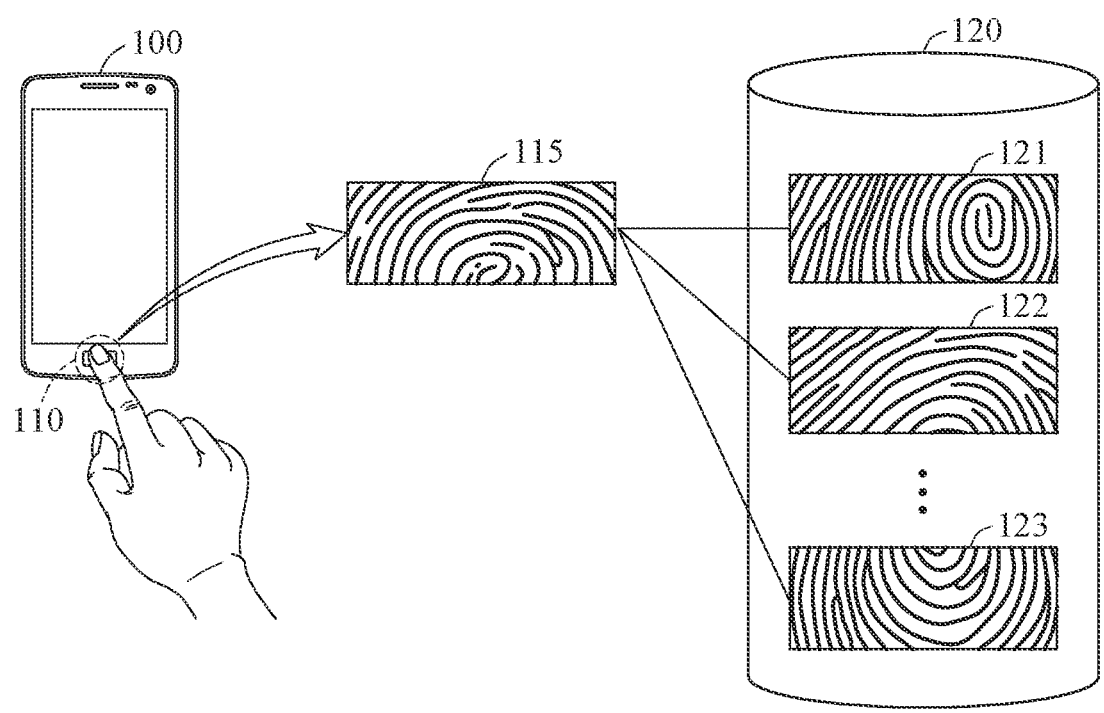
FIG. 1 illustrates an example of a biometric information recognition method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various members, components, regions, layers, or sections, the members, components, regions, layers, or sections are not limited to the terms. These terms should be used only to distinguish one member, component region, layer, or section from another member, component region, layer, or section. For example, a "first" member, component region, layer, or section referred to in examples described herein may also be referred to as a "second" member, component region, layer, or section, or similarly, and the "second" component may be referred to as the "first" component within the scope of the right according to the concept of the present disclosure.

Throughout the specification, it will be understood that when a component or element is referred to as being "on," "connected to" or "coupled to" another component or element, it may be directly on, connected to, or coupled to the other component or element, or there may be one or more intervening elements therebetween. In contrast, when a component or element is referred to as being "directly on," "directly connected to," or "directly coupled to" another component or element, there are no intervening components or elements present. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood. Terms defined in dictionaries generally used should be construed to have meanings matching with contextual meanings in the related art and the present disclosure, and are not to be construed as an ideal or excessively formal meaning unless otherwise defined herein.

Examples may be implemented as various forms of products including, for example, a personal computer (PC), a laptop computer, a tablet computer, a smartphone, a television (TV), a smart home appliance, an intelligent vehicle, a kiosk, and/or a wearable device. Hereinafter, examples will be described in detail with reference to the accompanying drawings. Like numbers refer to like elements throughout the description of the figures.

FIG. 1 illustrates an example of a biometric information recognition method. In FIG. 1, for convenience of description, biometric information is shown as a fingerprint. However, the following examples may be substantially equally applicable to a variety of biometric information that may be recognized in a form of an image, for example, a vein or an iris.

Referring to FIG. 1, a fingerprint recognition apparatus 100 may include a fingerprint sensor 110 configured to sense a fingerprint of a user. The fingerprint recognition apparatus 100 may obtain an input fingerprint image 115 representing the fingerprint of the user, using the fingerprint sensor 110. The fingerprint recognition apparatus 100 may be, or may include, any of a personal computer (PC), a laptop computer, a tablet computer, a smartphone, a television (TV), a smart home appliance, an intelligent vehicle, a kiosk, and a wearable device.

For recognition of a fingerprint, fingerprint enrollment may be performed. Enrolled fingerprint images 121, 122 and 123 may be stored in advance in an enrolled fingerprint database (DB) 120 through a fingerprint enrollment process. To protect personal information, the enrolled fingerprint DB 120 may store features extracted from the enrolled fingerprint images 121, 122 and 123, instead of storing the enrolled fingerprint images 121, 122 and 123 without a change. The enrolled fingerprint DB 120 may be stored in a memory included in the fingerprint recognition apparatus 100, or an external device such as a server that may communicate with the fingerprint recognition apparatus 100.

For example, when the input fingerprint image 115 for authentication is received by the fingerprint recognition apparatus 100, the fingerprint recognition apparatus 100 may recognize the fingerprint of the user by comparing a fingerprint (hereinafter, referred to as an "input fingerprint") included in the input fingerprint image 115 to enrolled fingerprints shown in the enrolled fingerprint images 121, 122 and 123. The fingerprint recognition apparatus 100 may compare a feature of the input fingerprint to features of the enrolled fingerprints.

When a fake fingerprint is sensed in the input fingerprint image 115 and when a fingerprint pattern of the input fingerprint image 115 is similar to a fingerprint pattern of one of the enrolled fingerprint images 121, 122 and 123, authentication for the fake fingerprint may be likely to succeed, when such authentication is performed by a typical fingerprint recognition apparatus. To prevent such a spoofing attack, the fingerprint recognition apparatus 100 of one or more embodiments may determine whether the input fingerprint in the input fingerprint image 115 is a fake fingerprint or a real fingerprint of a human. In an example, the fingerprint recognition apparatus 100 of one or more embodiments may be or include an anti-spoofing apparatus, to detect whether the input fingerprint is a fake fingerprint using the anti-spoofing apparatus. In the following description, the anti-spoofing apparatus may be referred to as a "fake fingerprint detection apparatus".

A typical fake fingerprint detection system may allow a real fingerprint and a fake fingerprint to be distinguished, using a neural network that is trained based on a DB provided in advance. However, in a predetermined situation in which the neural network does not learn, performance of the typical fake fingerprint detection system may decrease. For example, since the typical fake fingerprint detection system uses only dichotomous results of a universally trained network, regardless of features for each user, the performance of the typical fake fingerprint detection system may decrease due to a difference between biometric features (for example, a crack of a fingerprint, or a relatively pale fingerprint) based on users. Also, since the typical fake fingerprint detection system does not use biometric information used in training of the network for authentication, the performance may decrease in a sensing situation in which it is difficult to train the network. Furthermore, when a new vulnerability related to detection of a fake fingerprint is discovered, a neural network of the typical fake fingerprint detection system may necessarily need to be retrained, and accordingly an emergency response may be difficult.

In contrast, the fake fingerprint detection apparatus of one or more embodiments may determine whether the input fingerprint is a fake fingerprint, based on a plurality of unspecified real fingerprint features provided in advance, a plurality of unspecified fake fingerprint features provided in advance, and/or enrolled fingerprint features of a user of a device, non-limiting examples of which will be further described below. The fake fingerprint detection apparatus of one or more embodiments may determine whether a fingerprint of a user is fake by reflecting biometric features of the user and characteristics such as assembly tolerance of a corresponding device. Thus, the fake fingerprint detection apparatus of one or more embodiments may enhance anti-spoofing performance.

Figure 2:
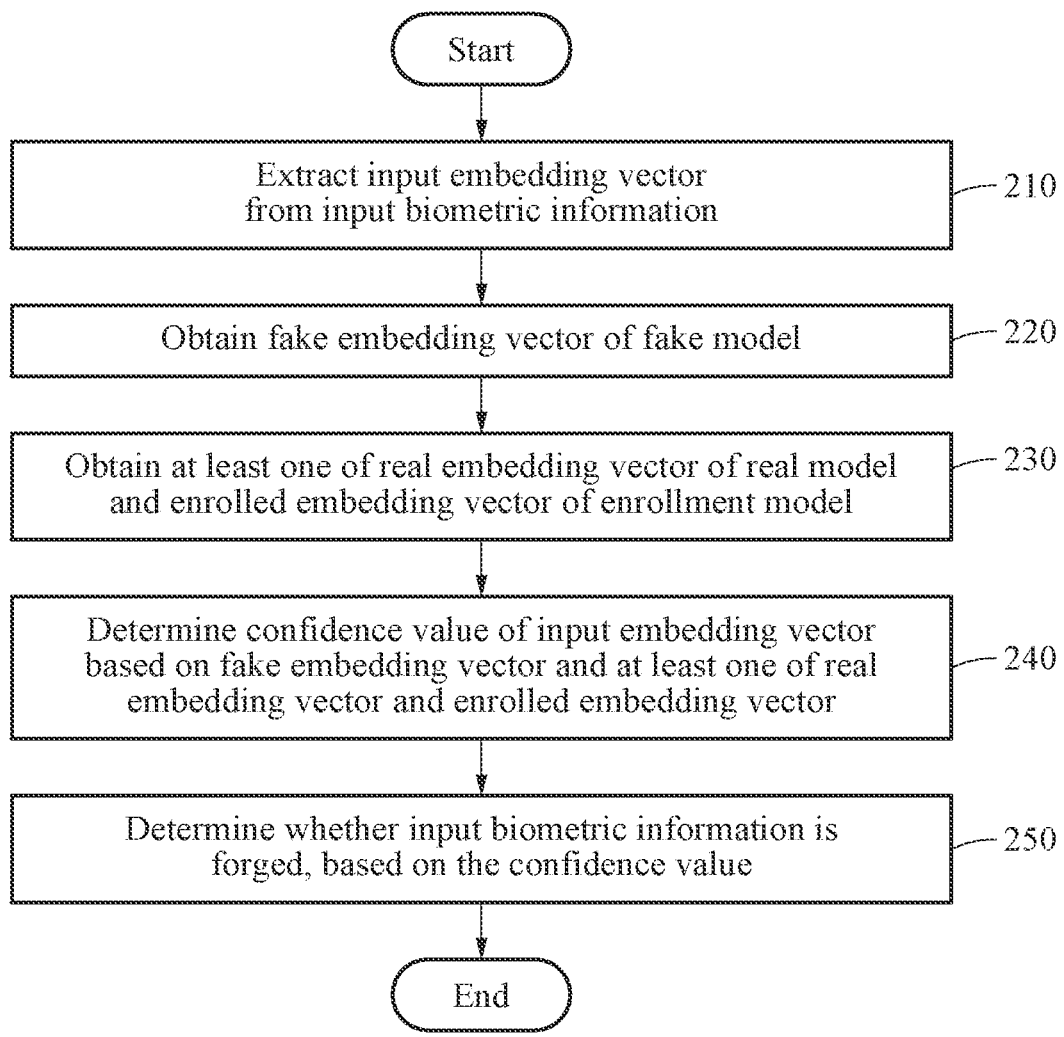
FIG. 2 illustrates an example of an anti-spoofing method.

FIG. 2 illustrates an example of an anti-spoofing method.

Referring to FIG. 2, operations 210 through 250 may be performed by the anti-spoofing apparatus of the fingerprint recognition apparatus 100 described above with reference to FIG. 1. The anti-spoofing apparatus may be implemented by one or more hardware modules implementing instructions.

In operation 210, the anti-spoofing apparatus may extract an input embedding vector from input biometric information. The anti-spoofing apparatus may receive the input biometric information sensed from a user and may obtain the input embedding vector corresponding to the input biometric information. The input biometric information may be the input fingerprint image 115 of FIG. 1.

The anti-spoofing apparatus may generate the input embedding vector from the input biometric information, using a neural network that is trained to extract a feature for detecting whether biometric information is forged. The neural network may be trained based on a plurality of pieces of unspecified real biometric information and a plurality of pieces of unspecified fake biometric information. Feature information for detecting whether biometric information is forged may be embedded in an embedding vector generated by the neural network, and the embedding vector may be referred to as a "feature vector."

In operation 220, the anti-spoofing apparatus may obtain a fake embedding vector of a fake model provided in advance, based on fake biometric information. The fake model may correspond to a set of fake embedding vectors extracted from a plurality of pieces of unspecified fake biometric information. The unspecified fake biometric information may be the same as those used in the above-described training of the neural network. The fake model may include all of a plurality of unspecified fake embedding vectors, or may include representative embedding vectors obtained through clustering.

In operation 230, the anti-spoofing apparatus may obtain, based on real biometric information, a real embedding vector of a real model provided in advance and/or an enrolled embedding vector of an enrollment model generated based on biometric information of an enrolled user. The real model may correspond to a set of real embedding vectors extracted from a plurality of pieces of unspecified real biometric information. The unspecified real biometric information may be the same as those used in the above-described training of the neural network. The real model may include all of a plurality of unspecified real embedding vectors, or may include representative embedding vectors obtained through clustering.

The enrollment model may refer to a set of enrolled embedding vectors extracted from the biometric information, for example, the enrolled fingerprint images 121, 122 and 123 of FIG. 1, of the enrolled user. The anti-spoofing apparatus may store the enrollment model in the enrolled fingerprint DB 120 of FIG. 1 in a fingerprint enrollment process.

In operation 240, the anti-spoofing apparatus may determine a confidence value of the input embedding vector based on the fake embedding vector, and the real embedding vector and/or the enrolled embedding vector. For example, the anti-spoofing apparatus may use the real embedding vector and/or the enrolled embedding vector together with the fake embedding vector to determine the confidence value of the input embedding vector. The confidence value of the input embedding vector may be an index indicating a similarity between an input fingerprint image and a real fingerprint. When the confidence value increases, a probability of being a real fingerprint may increase. Non-limiting examples of determining a confidence value will be further described below with reference to FIGS. 3 through 4C.

In operation 250, the anti-spoofing apparatus may determine whether the input biometric information is forged, based on the confidence value. For example, when the confidence value is greater than or equal to a predetermined threshold, the anti-spoofing apparatus may determine that the input biometric information is not forged. When the confidence value is less than the predetermined threshold, the anti-spoofing apparatus may determine that the input biometric information is forged.

Figure 3:
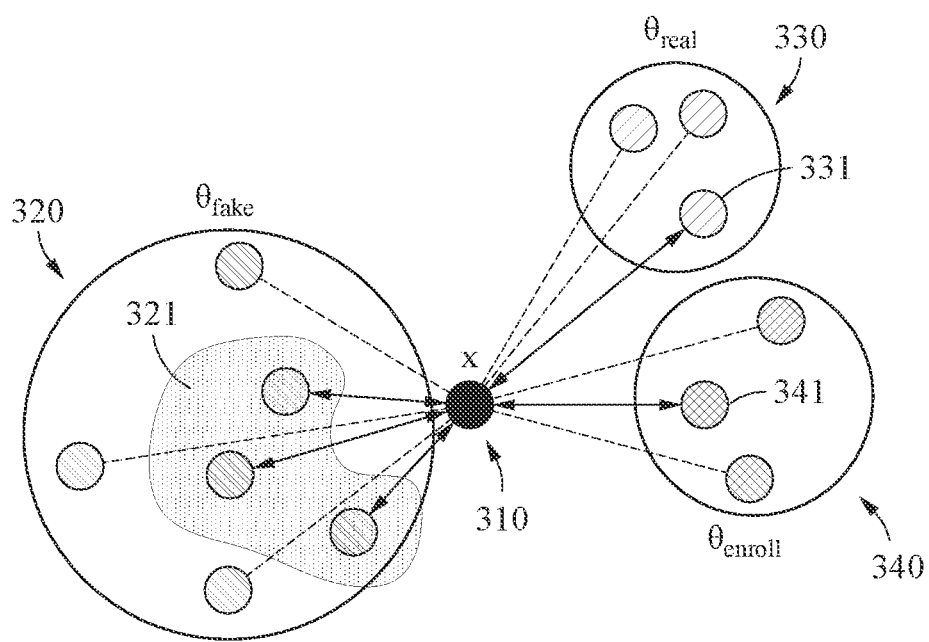
FIG. 3 illustrates an example of estimating a posterior probability.

FIG. 3 illustrates an example of estimating a posterior probability. The above descriptions of FIGS. 1 and 2 are also applicable to FIG. 3, and thus the above descriptions are not repeated here.

Referring to FIG. 3, an anti-spoofing apparatus may determine a confidence value of an input embedding vector 310 based on a fake embedding vector of a fake model 320, a real embedding vector of a real model 330, and/or an enrolled embedding vector of an enrollment model 340. The anti-spoofing apparatus of one or more embodiments may determine the confidence value of the input embedding vector 310 based on the fake embedding vector in addition to the real embedding vector or an enrolled embedding vector of a user, and thus the anti-spoofing apparatus of one or more embodiments may determine whether biometric information is forged even in an environment in which biometric features of users are different and/or various sensing environments.

The confidence value of the input embedding vector 310 may be determined based on a posterior probability between the input embedding vector 310 and the fake embedding vector, the real embedding vector, and/or the enrolled embedding vector. The posterior probability may be a probability that an event is estimated to have occurred due to a predetermined cause after an occurrence of the event, and may be, for example, a probability of estimating whether observed input biometric information is fake biometric information, real biometric information, or enrolled biometric information. To estimate a posterior probability, the anti-spoofing apparatus may calculate a distance, for example, a Euclidean distance, between embedding vectors, or a similarity, for example, a cosine similarity, between embedding vectors.

The anti-spoofing apparatus may determine a representative vector that is used to estimate a posterior probability with the input embedding vector 310. In an example, the anti-spoofing apparatus may select, as a representative vector, a vector closest to the input embedding vector 310 from any one or more of the fake model 320, the real model 330, and the enrollment model 340. For example, the anti-spoofing apparatus may determine a real embedding vector 331 closest to the input embedding vector 310 in the real model 330 to be a representative embedding vector of the real model 330. Similarly, the anti-spoofing apparatus may determine an enrolled embedding vector 341 closest to the input embedding vector 310 in the enrollment model 340 to be a representative embedding vector of the enrollment model 340.

In another example, the anti-spoofing apparatus may determine a predetermined number of embedding vectors close to the input embedding vector 310 in the fake model 320, the real model 330, and/or the enrollment model 340, to be a representative embedding vector set. For example, the anti-spoofing apparatus may determine a predetermined number of fake embedding vectors 321 close to the input embedding vector 310 in the fake model 320 to be a representative embedding vector set of the fake model 320. In another example, the anti-spoofing apparatus may determine an average value of a predetermined number of embedding vectors close to the input embedding vector 310 in the fake model 320, the real model 330, and/or the enrollment model 340, to be a representative embedding vector. For example, the anti-spoofing apparatus may determine an average value of a predetermined number of fake embedding vectors 321 close to the input embedding vector 310 in the fake model 320 to be a representative embedding vector of the fake model 320. The anti-spoofing apparatus may estimate a posterior probability between the input embedding vector 310 and a representative embedding vector. In an example, the predetermined number of fake embedding vectors 321 close to the input embedding vector 310 in the fake model 320 are the predetermined number of fake embedding vectors closest to the input embedding vector 310, among the fake embedding vectors of the fake model 320.

In an example, a posterior probability between the input embedding vector 310 and the real embedding vector 331 that is the representative embedding vector of the real model 330 may be expressed as shown in Expression 1 below, for example.

$$\sup_{\theta \in \theta_{real}} P(x|\theta) \qquad \text{Expression 1:}$$

In Expression 1, P(·) denotes an operator for a posterior probability, and sup denotes an operation for supremum. The supremum may be the least upper bound. Thus, Expression 1 may indicate a highest posterior probability among posterior probabilities between the input embedding vector 310 and real embedding vectors included in the real model 330.

A posterior probability between the input embedding vector 310 and the enrolled embedding vector 341 that is the representative embedding vector of the enrollment model 340 may be expressed as shown in Expression 2 below, for example.

$$\sup_{\theta \in \theta_{enroll}} P(x|\theta) \qquad \text{Expression 2:}$$

Expression 2 may indicate a highest posterior probability among posterior probabilities between the input embedding vector 310 and enrolled embedding vectors included in the enrollment model 340.

A posterior probability between the input embedding vector 310 and the representative embedding vector set of the fake model 320 may be expressed as shown in Expression 3 below, for example.

$$\frac{1}{N} \sum_{\theta_{fake} \in Nbest} P(x|\theta_{fake}) \qquad \text{Expression 3}$$

Expression 3 may indicate an average value of posterior probabilities between the input embedding vector 310 and "N" fake embedding vectors 321 (where "N" is the predetermined number, for example), denoted by Nbest, closest to the input embedding vector 310 among fake embedding vectors included in the fake model 320. As described above, a posterior probability may be calculated as a distance or a similarity between embedding vectors. Based on Expression 3, the anti-spoofing apparatus may estimate the posterior probability based on an average value of distances between the input embedding vector 310 and the "N" fake embedding vectors 321 included in the representative embedding vector set of the fake model 320.

Depending on examples, determining of representative embedding vectors is not limited to Expressions 1 to 3. For example, a predetermined number of embedding vectors included in the real model 330 and the enrollment model 340 and located close to the input embedding vector 310 may also be determined to be a representative embedding vector set, and an embedding vector included in the fake model 320 and located closest to the input embedding vector 310 may also be determined to be a representative embedding vector.

The anti-spoofing apparatus may determine a confidence value of the input embedding vector based on an estimated posterior probability. Non-limiting examples of determining a confidence value of an input embedding vector based on an estimated posterior probability will be described below with reference to FIGS. 4A through 4C.

Figure 4A:
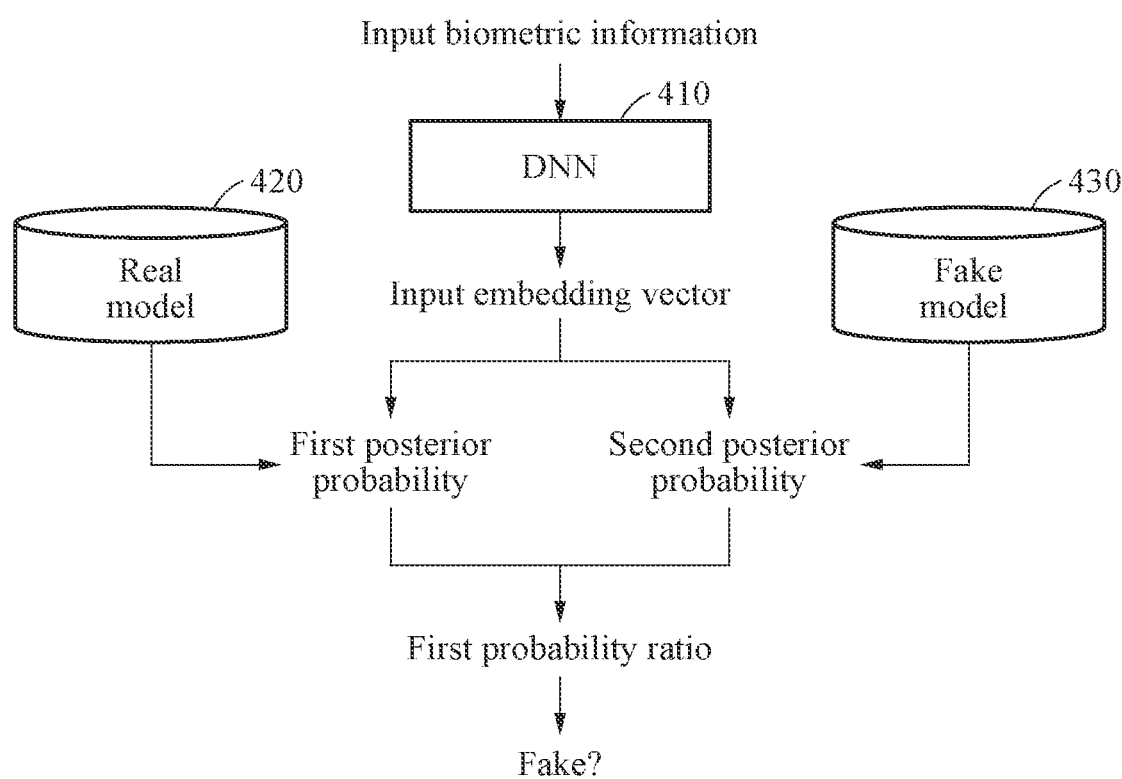
FIGS. 4A through 4C illustrate examples of determining a confidence value of an input embedding vector based on an estimated posterior probability.
Figure 4B:
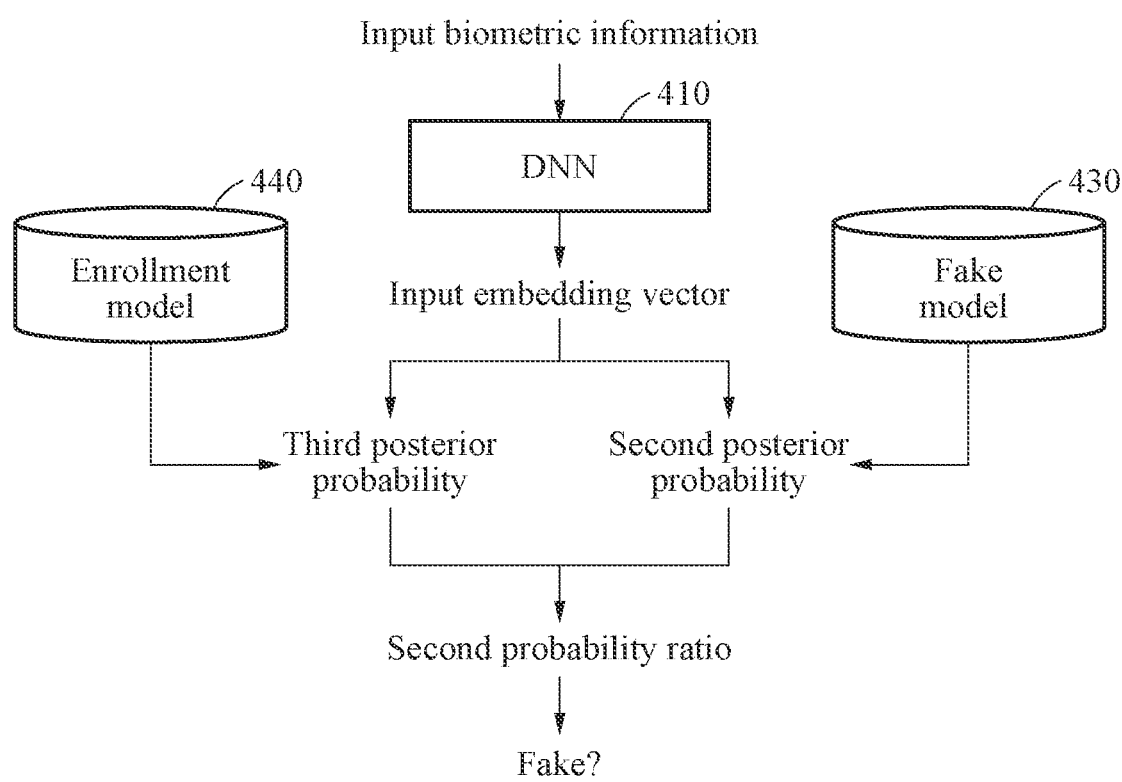
Figure 4C:
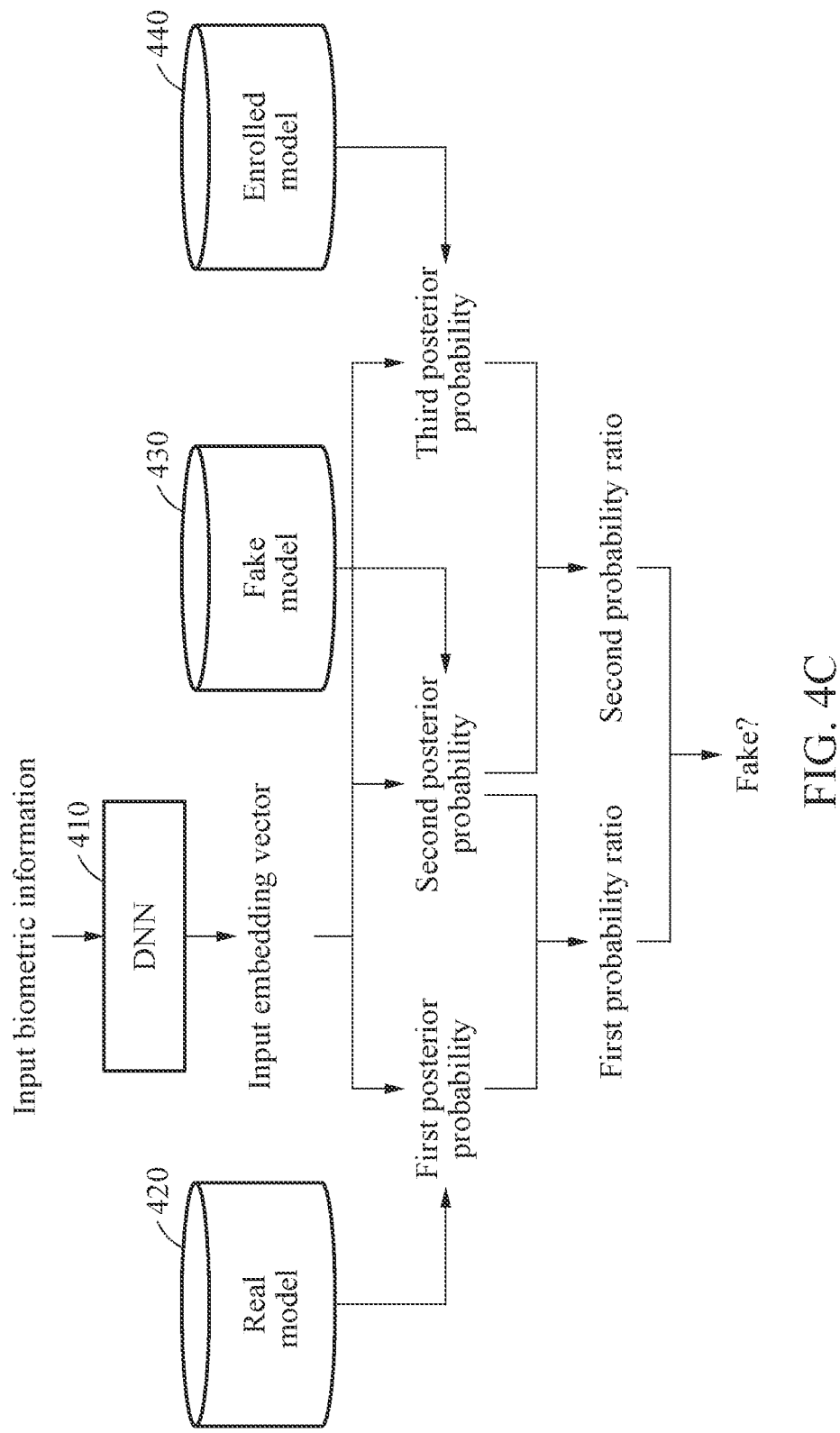

FIGS. 4A through 4C illustrate examples of determining a confidence value of an input embedding vector based on an estimated posterior probability. The above descriptions of FIGS. 1 through 3 are also applicable to the examples of FIGS. 4A through 4C, and thus the above descriptions are not repeated here.

Referring to FIG. 4A, an anti-spoofing apparatus may determine a confidence value of an input embedding vector based on a real embedding vector of a real model 420 and a fake embedding vector of a fake model 430. The anti-spoofing apparatus may extract an input embedding vector corresponding to input biometric information using a neural network 410 (for example, a deep neural network).

In an example, the anti-spoofing apparatus may estimate a first posterior probability between the input embedding vector and a representative embedding vector of the real model 420, and a second posterior probability between the input embedding vector and a representative embedding vector set of the fake model 430.

In this example, the anti-spoofing apparatus may calculate a first probability ratio that is a probability ratio between the first posterior probability and the second posterior probability, and may determine the first probability ratio as a confidence value of the input embedding vector. For example, the first probability ratio may be calculated as shown in Expression 4 below.

$$\frac{sup_{\theta \in \Theta_{real}} P(x|\theta)}{\frac{1}{N} \sum_{\theta_{fake} \in Nbest} P(x|\theta_{fake})} \quad \text{Expression 4}$$

In Expression 4, a denominator may correspond to Expression 3 and a numerator may correspond to Expression 1.

In another example, the anti-spoofing apparatus may estimate a first posterior probability between the input embedding vector and a representative embedding vector set of the real model 420, and a second posterior probability between the input embedding vector and a representative embedding vector set of the fake model 430. In this example, the first probability ratio may be calculated as shown in Expression 5 below.

$$\frac{\frac{1}{N} \sum_{\theta_{real} \in Nbest} P(x|\theta_{real})}{\frac{1}{N} \sum_{\theta_{fake} \in Nbest} P(x|\theta_{fake})} \quad \text{Expression 5}$$

In Expression 5, a denominator may correspond to Expression 3. A numerator of Expression 5 may correspond to an average value of posterior probabilities between the input embedding vector and "N" real embedding vectors, denoted by Nbest, closest to the input embedding vector among real embedding vectors included in the real model 420.

When the first probability ratio that is the confidence value of the input embedding vector is greater than or equal to a predetermined threshold, the anti-spoofing apparatus may determine that the input biometric information is not forged. When the first probability ratio is less than the threshold, the anti-spoofing apparatus may determine that the input biometric information is forged.

Referring to FIG. 4B, the anti-spoofing apparatus may determine a confidence value of an input embedding vector based on a fake embedding vector of a fake model 430 and an enrolled embedding vector of an enrollment model 440.

In an example, the anti-spoofing apparatus may estimate a third posterior probability between the input embedding vector and a representative embedding vector of the enrollment model 440, and a second posterior probability between the input embedding vector and a representative embedding vector set of the fake model 430.

In this example, the anti-spoofing apparatus may calculate a second probability ratio that is a probability ratio between the second posterior probability and the third posterior probability, and may determine the second probability ratio as a confidence value of the input embedding vector. For example, the second probability ratio may be calculated as shown in Expression 6 below.

$$\frac{sup_{\theta \in \Theta_{enroll}} P(x|\theta)}{\frac{1}{N} \sum_{\theta_{fake} \in Nbest} P(x|\theta_{fake})} \quad \text{Expression 6}$$

In Expression 6, a denominator may correspond to Expression 3 and a numerator may correspond to Expression 2.

In another example, the anti-spoofing apparatus may estimate a third posterior probability between the input embedding vector and a representative embedding vector set of the enrollment model 440, and a second posterior probability between the input embedding vector and a representative embedding vector set of the fake model 430. In this example, the second probability ratio may be calculated as shown in Expression 7 below.

$$\frac{\frac{1}{N} \sum_{\theta_{enroll} \in Nbest} P(x|\theta_{enroll})}{\frac{1}{N} \sum_{\theta_{fake} \in Nbest} P(x|\theta_{fake})} \quad \text{Expression 7}$$

In Expression 7, a denominator may correspond to Expression 3. A numerator of Expression 7 may correspond to an average value of posterior probabilities between the input embedding vector and "N" enrolled embedding vectors, denoted by Nbest, closest to the input embedding vector among enrolled embedding vectors included in the enrollment model 440.

When the second probability ratio that is the confidence value of the input embedding vector is greater than or equal to a predetermined threshold, the anti-spoofing apparatus may determine that the input biometric information is not forged. When the second probability ratio is less than the threshold, the anti-spoofing apparatus may determine that the input biometric information is forged.

To control variability of values or limit a range of values, the anti-spoofing apparatus may normalize a probability ratio using a log or sigmoid function. For example, the normalized probability ratio may be expressed as shown in Expression 8 below.

$$\frac{1}{1 + e - \log(\text{Probability ratio})} \quad \text{Expression 8}$$

When the normalized probability ratio that is the confidence value of the input embedding vector is greater than or equal to a predetermined threshold, the anti-spoofing apparatus may determine that the input biometric information is not forged. When the normalized probability ratio is less than the threshold, the anti-spoofing apparatus may determine that the input biometric information is forged.

Referring to FIG. 4C, the anti-spoofing apparatus may determine a confidence value of an input embedding vector based on a real embedding vector of a real model 420, a fake embedding vector of a fake model 430, and an enrolled embedding vector of an enrollment model 440. As described above with reference to FIGS. 4A and 4B, the anti-spoofing apparatus may calculate a first probability ratio and a second probability ratio. Further, the anti-spoofing apparatus may determine the confidence value of the input embedding vector based on the first probability ratio and the second probability ratio. For example, the anti-spoofing apparatus may determine a result of a weighted summation of the first probability ratio and the second probability ratio as the confidence value of the input embedding vector. The result of the weighted summation of the first probability ratio and the second probability ratio may be expressed as shown in Expression 9 below, for example.

$$\beta \frac{\sup_{\theta \in \Theta_{real}} P(x|\theta)}{\frac{1}{N}\sum_{\theta_{fake} \in Nbest} P(x|\theta_{fake})} +$$
$$(1-\beta) \frac{\sup_{\theta \in \Theta_{enroll}} P(x|\theta)}{\frac{1}{N}\sum_{\theta_{fake} \in Nbest} P(x|\theta_{fake})}$$

Expression 9

When the confidence value of the input embedding vector is greater than or equal to a predetermined threshold, the anti-spoofing apparatus may determine that the input biometric information is not forged. When the confidence value is less than the threshold, the anti-spoofing apparatus may determine that the input biometric information is forged. For example, the anti-spoofing apparatus may determine whether the input biometric information is forged based on Expression 10 shown below.

$$\beta \frac{\sup_{\theta \in \Theta_{real}} P(x|\theta)}{\frac{1}{N}\sum_{\theta_{fake} \in Nbest} P(x|\theta_{fake})} +$$
$$(1-\beta) \frac{\sup_{\theta \in \Theta_{enroll}} P(x|\theta)}{\frac{1}{N}\sum_{\theta_{fake} \in Nbest} P(x|\theta_{fake})} \overset{accept}{\underset{reject}{\gtrless}} \gamma_{th}$$

Expression 10

The anti-spoofing apparatus may determine a value of a first category corresponding to a case in which the input biometric information is not forged, based on a first distance between the real embedding vector and the input embedding vector and a third distance between the enrolled embedding vector and the input embedding vector. Also, the anti-spoofing apparatus may determine a value of a second category corresponding to a case in which the input biometric information is forged, based on a second distance between the fake embedding vector and the input embedding vector.

The anti-spoofing apparatus may determine the confidence value of the input embedding vector based on the value of the first category and the value of the second category. For example, the anti-spoofing apparatus may apply the value of the first category and the value of the second category to a softmax function, to calculate the confidence value of the input embedding vector.

In an example, the anti-spoofing apparatus may also determine the confidence value of the input embedding vector based on Expressions 11 and 12 shown below (for example, the anti-spoofing apparatus may determine a result of Expression 11 as the confidence value of the input embedding vector).

$$\frac{e^{-dist_{enroll/real}}}{e^{-dist_{enroll/real}} + e^{-dist_{fake}}}$$

Expression 11

In Expression 11, $dist_{fake}$ denotes a distance between the input embedding vector and the fake embedding vector and may correspond to the value of the second category. Also, $dist_{enroll}/real$ may be calculated by Expression 12 and may correspond to the value of the first category.

$dist_{enroll/real} = \gamma \times \min(dist_{enroll}, dist_{real}) + (1-\gamma) \times dist_{enroll}$ Expression 12:

In Expression 12, $dist_{enroll}$ denotes a distance between the input embedding vector and the enrolled embedding vector, and $dist_{real}$ denotes a distance between the input embedding vector and the real embedding vector. Also, $\gamma$ denotes a weight for weighted summation and may have a value of "0.5".

Figure 5A:
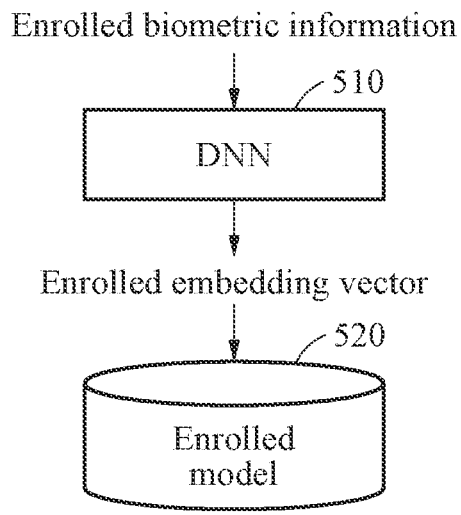
FIGS. 5A and 5B illustrate examples of enrolling biometric information by preventing spoofing.
Figure 5B:
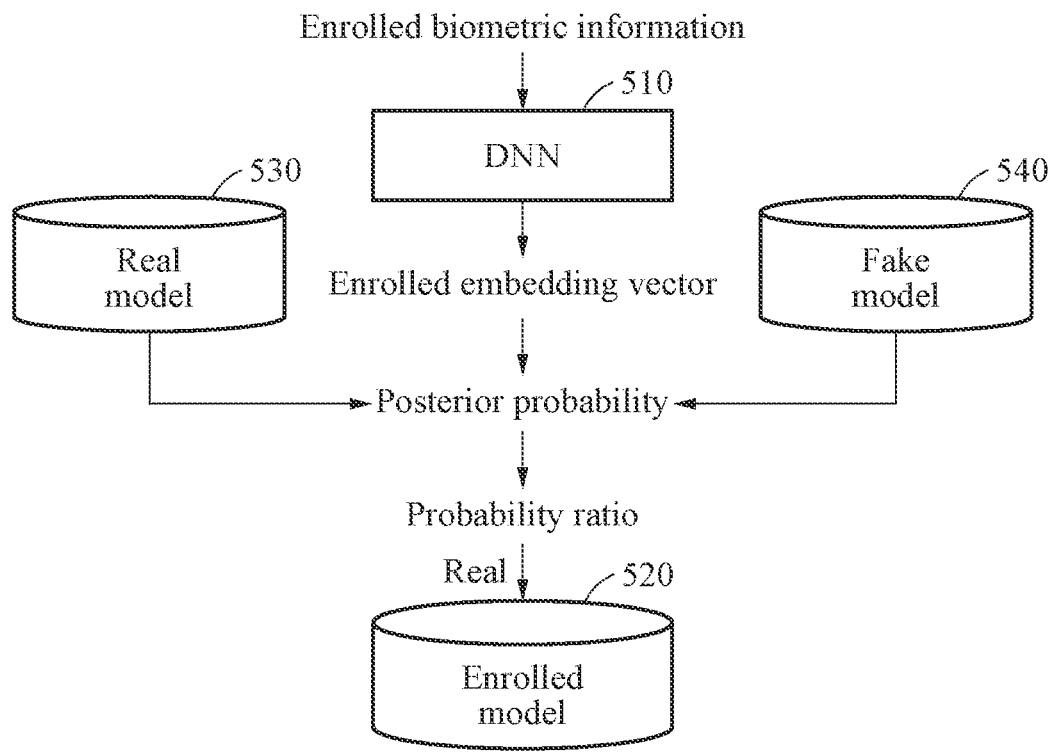

FIGS. 5A and 5B illustrate examples of enrolling biometric information by preventing spoofing. The above descriptions of FIGS. 1 through 4C are also applicable to the examples of FIGS. 5A and 5B, and thus the above descriptions are not repeated here.

In an example, an anti-spoofing apparatus may generate an enrollment model based on biometric information enrolled for biometric authentication. In an example, the enrollment model may be generated under assumption that all the enrolled biometric information is not forged. In another example, the enrollment model may be generated based on enrolled biometric information determined not to be forged, using a real model and a fake model.

Referring to FIG. 5A, the anti-spoofing apparatus may generate an enrollment model under assumption that all enrolled biometric information is not forged. The anti-spoofing apparatus may extract an enrolled embedding vector corresponding to the enrolled biometric information using a neural network 510, and may store the enrolled embedding vector in an enrollment model 520.

Referring to FIG. 5B, the anti-spoofing apparatus may generate an enrollment model based on enrolled biometric information determined not to be forged, using a real model 530 and a fake model 540. The anti-spoofing apparatus may extract an enrolled embedding vector corresponding to the enrolled biometric information using a neural network 510, may estimate a posterior probability between the enrolled embedding vector and a real embedding vector of the real model 530 and a posterior probability between the enrolled embedding vector and a fake embedding vector of the fake model 540, and may determine a confidence value of the enrolled embedding vector based on a probability ratio between the estimated posterior probabilities. The anti-spoofing apparatus may store an enrolled embedding vector with a confidence value that is greater than or equal to a predetermined threshold in an enrollment model 520.

Figure 6:
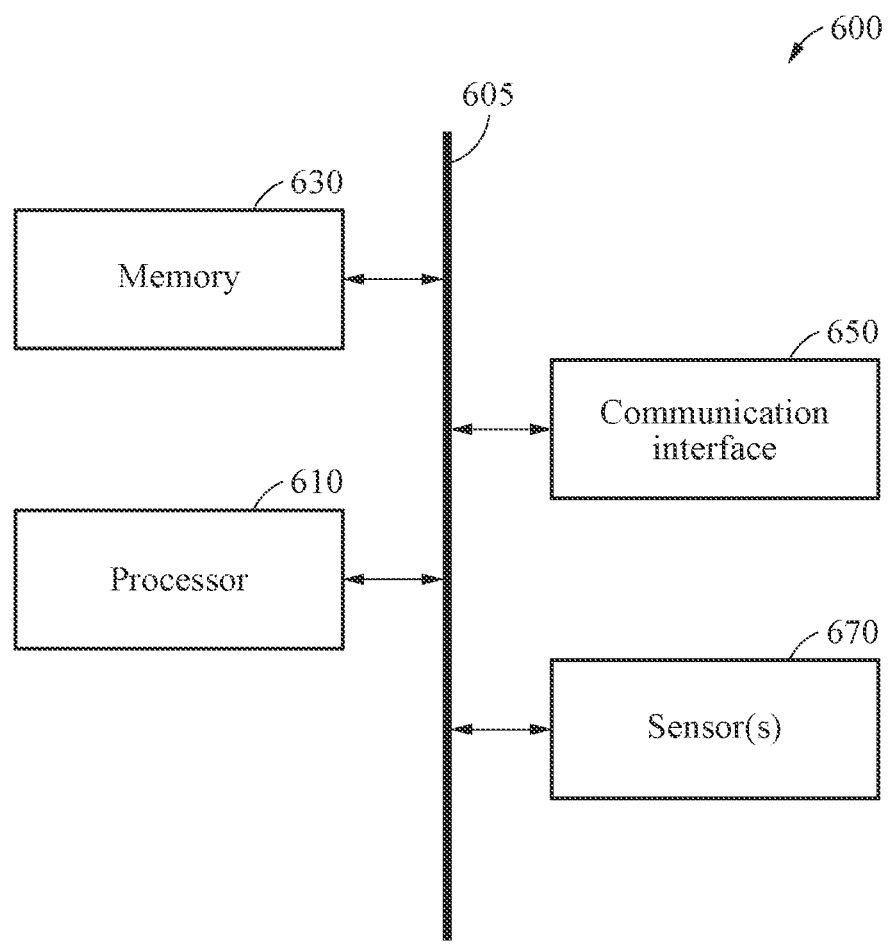
FIG. 6 illustrates an example of an anti-spoofing apparatus.

FIG. 6 illustrates an example of an anti-spoofing apparatus (for example, an anti-spoofing apparatus 600).

Referring to FIG. 6, the anti-spoofing apparatus 600 may include a processor 610 (for example, one or more processors), a memory 630, a communication interface 650, and sensors 670. The processor 610, the memory 630, the communication interface 650, and the sensors 670 may communicate with each other via a communication bus 605. The anti-spoofing apparatus 600 may perform any or all operations described above with reference to FIGS. 1 through 5B.

The processor 610 may extract an input embedding vector corresponding to input biometric information for authentication, may obtain a fake embedding vector of a fake model provided in advance, may obtain a real embedding vector of a real model provided in advance, and/or an enrolled embedding vector of an enrollment model, and may determine a confidence value of the input embedding vector based on the fake embedding vector, and the real embedding vector and/or the enrolled embedding vector to determine whether the input biometric information is forged.

For example, the processor 610 may extract the input embedding vector from the input biometric information, using a neural network that is trained to extract a feature suitable for detecting whether biometric information is forged.

The memory 630 may include a DB configured to store the real model, the fake model and/or the enrollment model. The memory 630 may store parameters of the neural network that are learned in advance. The sensors 670 may be a device configured to sense biometric information of a user, and may include, for example, a fingerprint sensor configured to sense a fingerprint of a user.

The processor 610 may estimate a posterior probability between the input embedding vector and the real embedding vector, the fake embedding vector and/or the enrolled embedding vector, and may determine the confidence value of the input embedding vector based on the posterior probability.

In addition, the processor 610 may perform an algorithm or the methods described above with reference to FIGS. 1 through 5B. The processor 610 may execute a program, and may control the anti-spoofing apparatus 600. Instructions of the program executed by the processor 610 may be stored in the memory 630. The anti-spoofing apparatus 600 may be connected to an external device (for example, a PC or a network) via an input/output device (not shown), and may exchange data with the external device. The anti-spoofing apparatus 600 may be, or may be included in, various computing apparatuses and/or systems, for example, a smartphone, a tablet computer, a laptop computer, a desktop computer, a TV, a wearable device, a security system, or a smart home system.

The fingerprint recognition apparatuses, fingerprint sensors, enrolled fingerprint DBs, anti-spoofing apparatuses, processors, memories, communication interfaces, sensors, communication buses, fingerprint recognition apparatus 100, fingerprint sensor 110, enrolled fingerprint DB 120, anti-spoofing apparatus 600, processor 610, memory 630, communication interface 650, sensors 670, communication bus 605, apparatuses, units, modules, devices, and other components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented anti-spoofing method comprising:
    extracting an input embedding vector from input biometric information;
    selecting, based on the input embedding vector, a fake embedding vector from among a plurality of fake embedding vectors of a predetermined fake model based on fake biometric information;
    obtaining either one or both of a real embedding vector of a predetermined real model and an enrolled embedding vector of an enrollment model the enrollment model being generated based on biometric information of an enrolled user;
    determining a confidence value of the input embedding vector based on a comparison between the input embedding vector and the selected fake embedding vector and one or more other comparisons between the input embedding vector and either one or both of the real embedding vector and the enrolled embedding vector; and
    determining whether the input biometric information is forged, based on the confidence value.

2. The method of claim 1, wherein the comparison comprises a posterior probability between the input embedding vector and the fake embedding vector.

3. The method of claim 2, wherein the posterior probability is calculated based on a distance or a similarity between the input embedding vector and the fake embedding vector.

4. The method of claim 1, wherein the determining of the confidence value comprises:
    determining a value of a first category corresponding to a case in which the input biometric information is not forged, based on a first distance between the real embedding vector and the input embedding vector and a third distance between the enrolled embedding vector and the input embedding vector;
    determining a value of a second category corresponding to a case in which the input biometric information is forged, based on a second distance between the fake embedding vector and the input embedding vector; and
    determining the confidence value based on the value of the first category and the value of the second category.

5. The method of claim 4, wherein the determining of the value of the first category comprises performing a weighted summation of the third distance and a lower value of the first distance and the third distance.

6. The method of claim 4, wherein the determining of the confidence value based on the value of the first category and the value of the second category comprises applying the value of the first category and the value of the second category to a softmax function and determining the confidence value.

7. The method of claim 1, wherein the determining of the confidence value comprises:
    estimating, as a result of the one or more other comparisons, either one or both of a first posterior probability between the input embedding vector and the real embedding vector and a third posterior probability between the input embedding vector and the enrolled embedding vector;
    estimating, as a result of the comparison, a second posterior probability between the input embedding vector and the fake embedding vector; and
    determining the confidence value based on the second posterior probability and the either one or both of the first posterior probability and the third posterior probability.

8. The anti-spoofing method of claim 7, wherein:
    the determining of the confidence value comprises calculating one or more probability ratios based on the second posterior probability and either one or both of the first posterior probability and the third posterior probability; and
    the determining of whether the input biometric information is forged comprises determining whether the input biometric information is forged based on the one or more probability ratios.

9. The method of claim 8, wherein
the calculating of the one or more probability ratios comprises:
calculating a first probability ratio between the first posterior probability and the second posterior probability; and
calculating a second probability ratio between the second posterior probability and the third posterior probability, and
the determining of the confidence value comprises performing a weighted summation of the first probability ratio and the second probability ratio.

10. The method of claim 1, further comprising:
determining one or more embedding vectors closest to the input embedding vector among a plurality of embedding vectors included in any one or any combination of the real model, the fake model and the enrollment model, to be a representative embedding vector.

11. The method of claim 1, wherein the fake embedding vector is an average value of a predetermined number of fake embedding vectors of the fake model that are closest to the input embedding vector.

12. The method of claim 1, wherein
the extracting of the input embedding vector comprises extracting the input embedding vector from the input biometric information using a neural network that is trained to extract a feature for detecting whether biometric information is forged, and
the neural network is trained based on the real biometric information and the fake biometric information.

13. The method of claim 1, wherein
the fake model corresponds to a set of fake embedding vectors extracted from the fake biometric information that is forged, and
the real model corresponds to a set of real embedding vectors extracted from unspecified real biometric information that is not forged.

14. A non-transitory computer-readable storage medium storing instructions that, when executed by a processor, configure the processor to perform the method of claim 1.

15. An anti-spoofing apparatus comprising:
a processor configured to:
extract an input embedding vector from input biometric information;
select, based on the input embedding vector, a fake embedding vector from among a plurality of fake embedding vectors of a predetermined fake model based on fake biometric information;
obtain either one or both of a real embedding vector of a real model and an enrolled embedding vector of an enrollment model the enrollment model being generated based on biometric information of an enrolled user;
determine a confidence value of the input embedding vector based on a comparison between the input embedding vector and the selected fake embedding vector and one or more other comparisons between the input embedding vector and either one or both of the real embedding vector and the enrolled embedding vector; and
determine whether the input biometric information is forged, based on the confidence value.

16. The apparatus of claim 15, wherein the comparison comprises a posterior probability between the input embedding vector and the fake embedding vector.

17. The apparatus of claim 15, wherein, for the determining of the confidence value, the processor is configured to:
determine a value of a first category corresponding to a case in which the input biometric information is not forged, based on a first distance between the real embedding vector and the input embedding vector and a third distance between the enrolled embedding vector and the input embedding vector;
determine a value of a second category corresponding to a case in which the input biometric information is forged, based on a second distance between the fake embedding vector and the input embedding vector; and
determine the confidence value based on the value of the first category and the value of the second category.

18. The apparatus of claim 15, wherein, for the determining of the confidence value, the processor is configured to:
estimate, as a result of the one or more other comparisons, either one or both of a first posterior probability between the input embedding vector and the real embedding vector and a third posterior probability between the input embedding vector and the enrolled embedding vector;
estimate, as a result of the comparison, a second posterior probability between the input embedding vector and the fake embedding vector; and
determine the confidence value based on the second posterior probability and the either one or both of the first posterior probability and the third posterior probability.

19. The apparatus of claim 18, wherein, for the determining of the confidence value, the processor is configured to:
calculate a first probability ratio between the first posterior probability and the second posterior probability;
calculate a second probability ratio between the second posterior probability and the third posterior probability; and
determine the confidence value based on the first probability ratio and the second probability ratio.

20. The apparatus of claim 19, wherein, for the determining of the confidence value based on the first probability ratio and the second probability ratio, the processor is configured to perform a weighted summation of the first probability ratio and the second probability ratio.

21. The anti-spoofing apparatus of claim 15, wherein the processor is configured to determine one or more embedding vectors closest to the input embedding vector among a plurality of embedding vectors included in any one or any combination of the real model, the fake model and the enrollment model, to be a representative embedding vector.

22. The apparatus of claim 15, wherein
for the extracting of the input embedding vector, the processor is configured to extract the input embedding vector from the input biometric information using a neural network that is trained to extract a feature for detecting whether biometric information is forged, and
the neural network is trained based on the real biometric information and the fake biometric information.

23. The apparatus of claim 15, comprising a sensor configured to sense the biometric information.

24. The apparatus of claim 23, wherein the sensor is a fingerprint sensor and the biometric information corresponds to a fingerprint.

25. A processor-implemented anti-spoofing method comprising:
extracting an input embedding vector from input biometric information;
determining a first, a second, and a third posterior probability respectively between the input embedding vector and a real embedding vector of a predetermined real model, a fake embedding vector of a predetermined fake model, and an enrolled embedding vector of an enrollment model of a user;

determining a confidence value of the input embedding vector based on a first probability ratio between the first posterior probability and the second posterior probability, and on a second probability ratio between the second posterior probability and the third posterior probability; and determining whether the input biometric information is forged, based on the confidence value.

* * * * *